(12) United States Patent
Ekler et al.

(10) Patent No.: US 9,942,129 B2
(45) Date of Patent: Apr. 10, 2018

(54) COMMUNICATION METHOD

(71) Applicants: Péter Ekler, Nagykovácsi (HU);
Charaf Hassan, Budapest (HU);
Bertalan Forstner, Budapest (HU);
László Lengyel, Biatorbágy (HU);
Róbert Béládi, Békés (HU); Vilmos Bilicki, Szeged (HU); Tibor Gyimóthy, Szeged (HU); Szilárd Iványi, Madaras (HU); Vilmos Szücs, Szeged (HU); Ádám Végh, Szeged (HU); Zoltán Rak, Szeged (HU); Márk Jelasity, Szeged (HU)

(72) Inventors: Péter Ekler, Nagykovácsi (HU);
Charaf Hassan, Budapest (HU);
Bertalan Forstner, Budapest (HU);
László Lengyel, Biatorbágy (HU);
Róbert Béládi, Békés (HU); Vilmos Bilicki, Szeged (HU); Tibor Gyimóthy, Szeged (HU); Szilárd Iványi, Madaras (HU); Vilmos Szücs, Szeged (HU); Ádám Végh, Szeged (HU); Zoltán Rak, Szeged (HU); Márk Jelasity, Szeged (HU)

(73) Assignees: Szegedi Tudományegyetem, Szeged (HU); Budapesti Müszaki és Gazdaságtudományi Egyetem, Budapest (HU)

( * ) Notice: Subject to any disclaimer, the term of this patent is extended or adjusted under 35 U.S.C. 154(b) by 683 days.

(21) Appl. No.: 14/555,829

(22) Filed: Nov. 28, 2014

(65) Prior Publication Data
US 2016/0127222 A1    May 5, 2016

Related U.S. Application Data

(60) Provisional application No. 62/073,123, filed on Oct. 31, 2014.

(51) Int. Cl.
*G06F 15/173* (2006.01)
*H04L 12/707* (2013.01)
(Continued)

(52) U.S. Cl.
CPC .............. *H04L 45/22* (2013.01); *H04L 9/083* (2013.01); *H04L 9/0822* (2013.01);
(Continued)

(58) Field of Classification Search
CPC ... H04L 67/141; H04L 67/104; H04L 61/256; H04L 61/2589; H04L 61/2575;
(Continued)

(56) References Cited

U.S. PATENT DOCUMENTS

2005/0198490 A1* 9/2005 Jaganathan ............... H04L 9/06
713/151
2007/0006291 A1* 1/2007 Barari ................... G06F 21/335
726/10

(Continued)

FOREIGN PATENT DOCUMENTS

WO    00/51293 A1    8/2000

OTHER PUBLICATIONS

Jiang: "A mechanism to discover STUN/TURN nodes in P2PSIP", Internet Engineering Task Force (IETF), 2007, pp. 1-15, XP015051853.

(Continued)

*Primary Examiner* — Philip Chea
*Assistant Examiner* — Mohammed Ahmed
(74) *Attorney, Agent, or Firm* — Jason D. Voight

(57) ABSTRACT

The subject matter of the invention is a communication method comprising the establishment of a communication route to a target partner not reachable by direct addressing by by-passing a node blocking the direct connection, further comprising the steps of setting up a TURN server at one or (Continued)

more users of the communication network in response to a definite and pre-granted request or in advance, and implementing the communication route to be established via at least one mentioned TURN server, with the effective mutual authorization management of the users involved in the communication session.

5 Claims, 6 Drawing Sheets

(51) Int. Cl.
    *H04L 29/12*     (2006.01)
    *H04L 29/06*     (2006.01)
    *H04W 4/00*     (2018.01)
    *H04L 9/32*     (2006.01)
    *H04L 9/08*     (2006.01)

(52) U.S. Cl.
    CPC ........ *H04L 9/3213* (2013.01); *H04L 61/2589* (2013.01); *H04L 63/062* (2013.01); *H04L 63/0807* (2013.01); *H04L 63/18* (2013.01); *H04L 65/1069* (2013.01); *H04W 4/008* (2013.01); *H04L 61/2514* (2013.01)

(58) Field of Classification Search
    CPC ....... H04L 67/16; H04L 9/0822; H04L 9/083; H04L 9/3213; H04L 63/062; H04L 63/0807; H04L 63/18

USPC ........................................................ 709/239
See application file for complete search history.

(56) References Cited

U.S. PATENT DOCUMENTS

| | | | | |
|---|---|---|---|---|
| 2007/0094503 A1* | 4/2007 | Ramakrishna | ........ | H04L 9/0822 713/172 |
| 2009/0316708 A1* | 12/2009 | Yahyaoui | .......... | H04L 29/12528 370/401 |
| 2012/0158991 A1* | 6/2012 | Ajjaguttu | ............... | H04B 7/155 709/238 |
| 2012/0240062 A1* | 9/2012 | Passmore | ................ | H04L 51/32 715/758 |
| 2015/0113154 A1* | 4/2015 | Nguyen | ................ | H04L 67/141 709/228 |
| 2015/0188882 A1* | 7/2015 | Wang | .................. | H04L 61/2589 370/352 |
| 2015/0281344 A1* | 10/2015 | Grootwassink | ........ | H04L 67/104 713/168 |

OTHER PUBLICATIONS

Mahy et al.: "Traversal Using Relays around NAT (TURN): Relay Extensions to Session Traversal Utilities for NAT (STUN)", Internet Engineering Task Force (IETF), 2010, pp. 1-67, XP015070780.

Perreault et al.: "Traversal Using Relays around NAT (TURN) Extensions for TCP Allocations", Internet Engineering Task Force (IETF), 2010, pp. 1-13, XP015073078.

* cited by examiner

COMMUNICATION METHOD

This application claims priority to provisional application Ser. No. 62/073,123, filed Oct. 31, 2014, the entire disclosure of which is hereby incorporated by reference.

The present invention relates to a communication method comprising the step of establishing a communication route to a target partner not reachable by direct addressing by by-passing a node blocking the direct connection.

BACKGROUND OF THE INVENTION

Classical peer-to-peer (P2P) solutions, that is, solutions where the entities—programs—communicate with each other directly, typically run on personal computers, sharing the resources of the latter. P2P solutions on mobile devices, such as Bittorrent, for example, can only function effectively having a background with powerful personal computers (PCs) or with a cloud-based background, for several reasons.

One reason of the limitations is Network Address Translation, NAT, under which the specific internal network devices are assigned an internal IP address instead of a real, public IP address, and this internal IP address is translated by an address translation device so that, externally, in an external network, a public IP address assigned to the individual packets is visible. This method is particularly widespread at service providers offering or providing wireless communication. Namely, with the depletion of the total number of $256^4$ of the IP4 addresses, network providers make increasing use of NAT or service provider's NAT, Carrier Grade Network Address Translation, CGNAT, solutions, i.e. address translations where every user is put behind NAT and, therefore, establishing a connection is a problem at the user, depending on the specific type of NAT. This problem is basically known in telephony, but it occurs with increasing frequency also in relation to the Internet. In P2P networks and in some applications using the P2P paradigm such as e.g. VoIP, IM, where not only service providers, but normal end-user terminals would also like to communicate with each other, communication between the parts realised with NAT functionalities in the networks is a major problem. Consequently, it is a typical fundamental problem that two users cannot establish direct contact with each other, because the service provider of one user rejects the connection-establishing requests coming from the other user, as outlined in FIG. 1.

In certain cases—symmetric NAT—devices behind NAT cannot be addressed from outside, from the side of the Internet so in such cases only the user behind the NAT can initiate an Internet connection. In the particular case when two devices behind their respective symmetric NATs, e.g. mobile phones, would like to communicate with each other, they will not be able to do so.

Nowadays two methods are known to handle such cases. Either the device (mobile phone, or set-top-box) instructs the running NAT service to open the necessary ports (see e.g. the UPNP protocol, a standard protocol to configure home NAT) or, in a generic solution to the problem, a mediator is involved between the two parties that cannot contact each other: it is permitted to establish connection with the intermediate entity and hence the intermediary entity and the user can communicate. The intermediary entity relays the traffic between the two communicating entities, as is also outlined in FIG. 1.

Communication takes place on two planes:
  Signalling—data of minor quantity, present on a mandatory basis or presumably, e.g. push or P2P overlay.
  Data traffic—data of major quantity that the parties are reluctant to transfer, but a third party involvement implies a security risk.

The experience is that users are reluctant to consent to their devices being the transmitters of data of larger quantities and, with mobile devices, neither is the transmission of large amounts of data to each other (e.g. vice/video calls) a technologically adequate solution due to energy and other problems. Signalling (call, ring etc.), however, is feasible also at this level.

The problem, therefore, is the adequate transmission of the data transmitted on the data channel (but that may also be the signaling itself). This communication problem is generally handed by one of two approaches:
  Solutions developed for this purpose include the standard protocols TURN (http://tools.ietf.org/html/rfc5766) and ICE (http://tools.ietf.org/html/rfc5245) and their specific implementations. TURN mediates between two communicating entities as a third party, with the traffic going through it; the dynamic domain name server, DNS, only connects the dynamic IP address to a constant URL. The TURN protocol itself, as is, is not suitable for the user concerned to connect two other users. It can only manage connections between the given user and related entities.
  A P2P network itself can also provide for nodes that realise the transfer (so-called super-nodes).

Big central TURN service providers, however, are not economical, since they ought to transmit high-volume traffic, and neither are they necessarily advantageous in terms of data security.

BRIEF SUMMARY OF THE INVENTION

The task to be solved by the present invention is to provide a solution whereby a public Internet connection can also be shared in a way that is both secure and practical, that is, whereby a user can share its own TURN capacity with any other user at its discretion, even if the other side would not want to communicate specifically with the former.

Present invention is based on the recognition that the uniform TURN infrastructure ought to be shared so as to base the transmission of huge amounts of data on many personal TURN servers. As is known, the TURN standard (RFC 5766, RFC 6062) in its current state does not support sharing, focusing as it does on mediation between the entities taking part in a communication session through it, that is, the user logging in to the TURN server can define channels with the help of the TURN messages, but one end of the channels concerned will always be occupied by himself.

For this purpose, the participants may serve the mobile devices at
  a network site actually having a free public IP address, not filtered, using a service not affected by network address translation, or
  at a place where the NAT traversal can be instructed through e.g. UPNP protocol,
e.g., through a home subscription, in cases where the devices concerned are behind symmetric NATs at the mobile or other service provider. In other words, they provide mediation between an own phone and devices behind NAT, e.g. mobiles of other licensed users, and the phones/devices they would like to, but cannot, communicate directly with due to NAT. Contrary to the current state of affairs and in a way that has not been obvious, nor recommended so far, instead of using one or several major public TURN servers, we operate an auxiliary device, the size of a USB stick for example, equipped with USB and Ethernet/Wifi ports, in the internal network of the user that will function as own TURN server with appropriate authorisation management. Such devices are easy to design based on the relevant knowledge of a person skilled in the art e.g. through the transformation of a device by a program realising the method according to the present invention such as can be found on the site http://www.aliexpress.com/store/product/MK808-MK808B-Bluetooth-Android-Mini-PC-TVBox-Dual-Core-Rockchip-RK3066-1 GB-RAM-8 GB-WiFi/803232_550279009.html, the screenshot of which is shown also in FIG. 3.

The present invention promotes the establishment of stable P2P networks: mobile devices have limited capabilities in terms of access, energy and network. The network connection of mobile devices in the known way is location-dependent, and realisation of the network connection plays a very big part in the energy consumption of the mobile devices. P2P solutions focusing on mobile devices, their stability and scaling, would require background services that are incompatible with the limits mentioned before. P2P infrastructure building blocks of this kind are currently PC-, i.e. cloud-, based, as e.g. Bittorrent or TOR;

data-security-enhancing solutions: on the one hand, TURN itself grants an IP address anonymity but, what is more important, the traffic does not go through any public TURN servers that would facilitate interception (of course, interception is feasible in any component of the network, but it is more difficult by orders of magnitude if there is no prominent point the interception of which would allow to monitor any traversing traffic). In present case, interception can be made more difficult at infrastructure level with the spread TURN infrastructure and the individual identification and authorisation management operations composed of known components connected to it;

beyond the public Internet connection, the TURN server applied in the method according to the present invention may play a part also in the given P2P system, e.g. in bootstrapping services. In such cases, it will provide for the infrastructure bases, not for resource sharing. One of these bases is NAT management, but e.g. bootstrapping (network detection), search, contact-maintenance etc. can also be regarded as such a basis.

That is, we have realised that infrastructure provision to mobile P2P applications can be realised by a high number of personal servers instead of a few big servers, that will ensure that the servers provide services to targeted users of choice or to a user group.

We have solved the task being set by a communication method as described herein. Preferred embodiments of the invention are also described herein.

In what follows, the present invention is described in more detail with reference to the enclosed drawing outlining exemplary implementations of the proposed method.

DETAILED DESCRIPTION OF THE INVENTION

Figure 1:
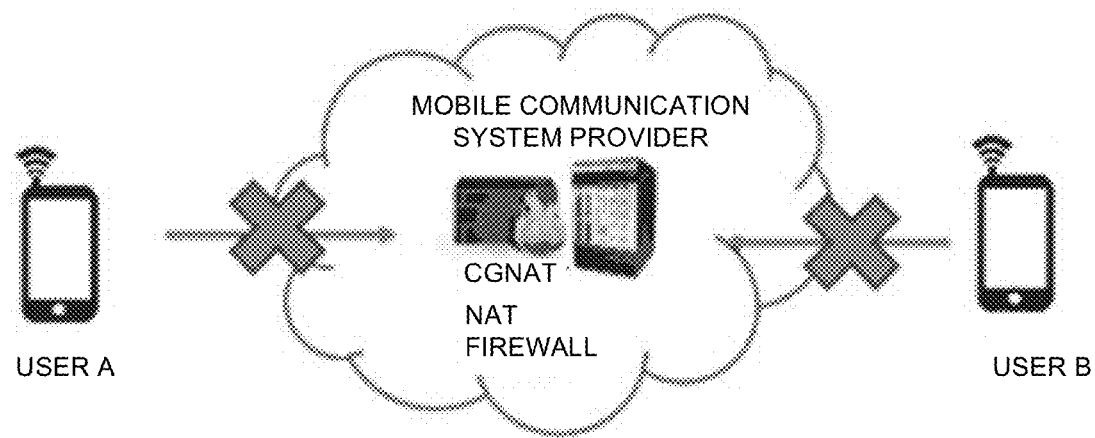
FIG. 1 shows schematically a traditional ineffective communication contact due to NAT.
Figure 2:
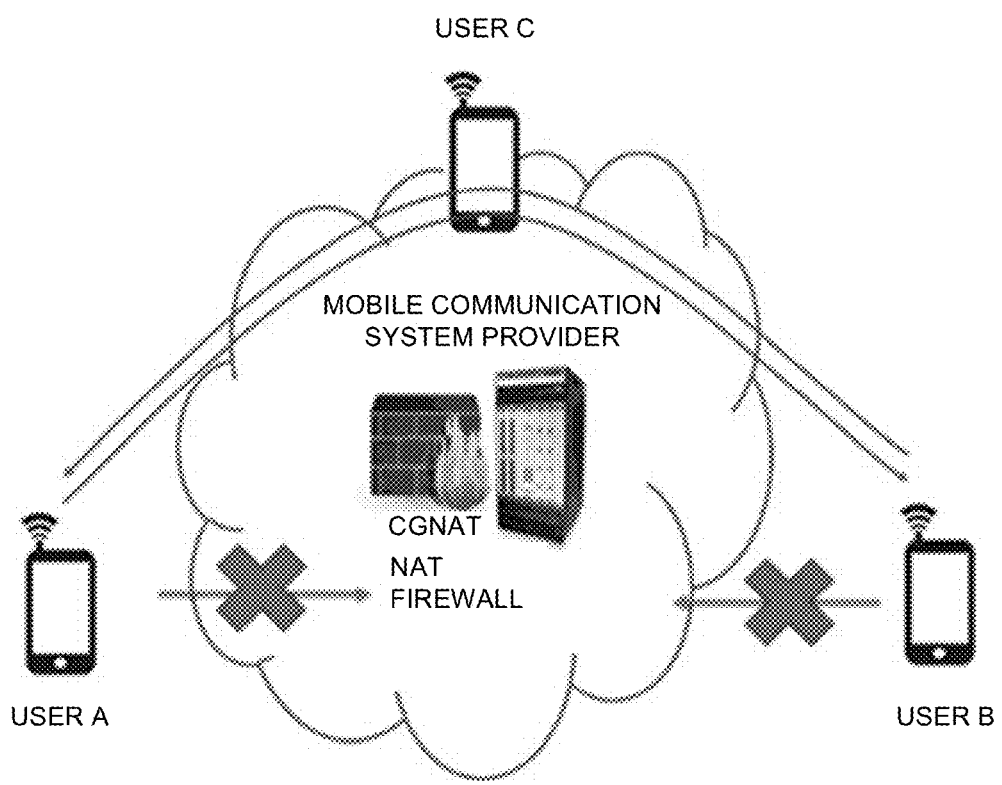
FIG. 2 shows the use of an intermediate entity.
Figure 3:
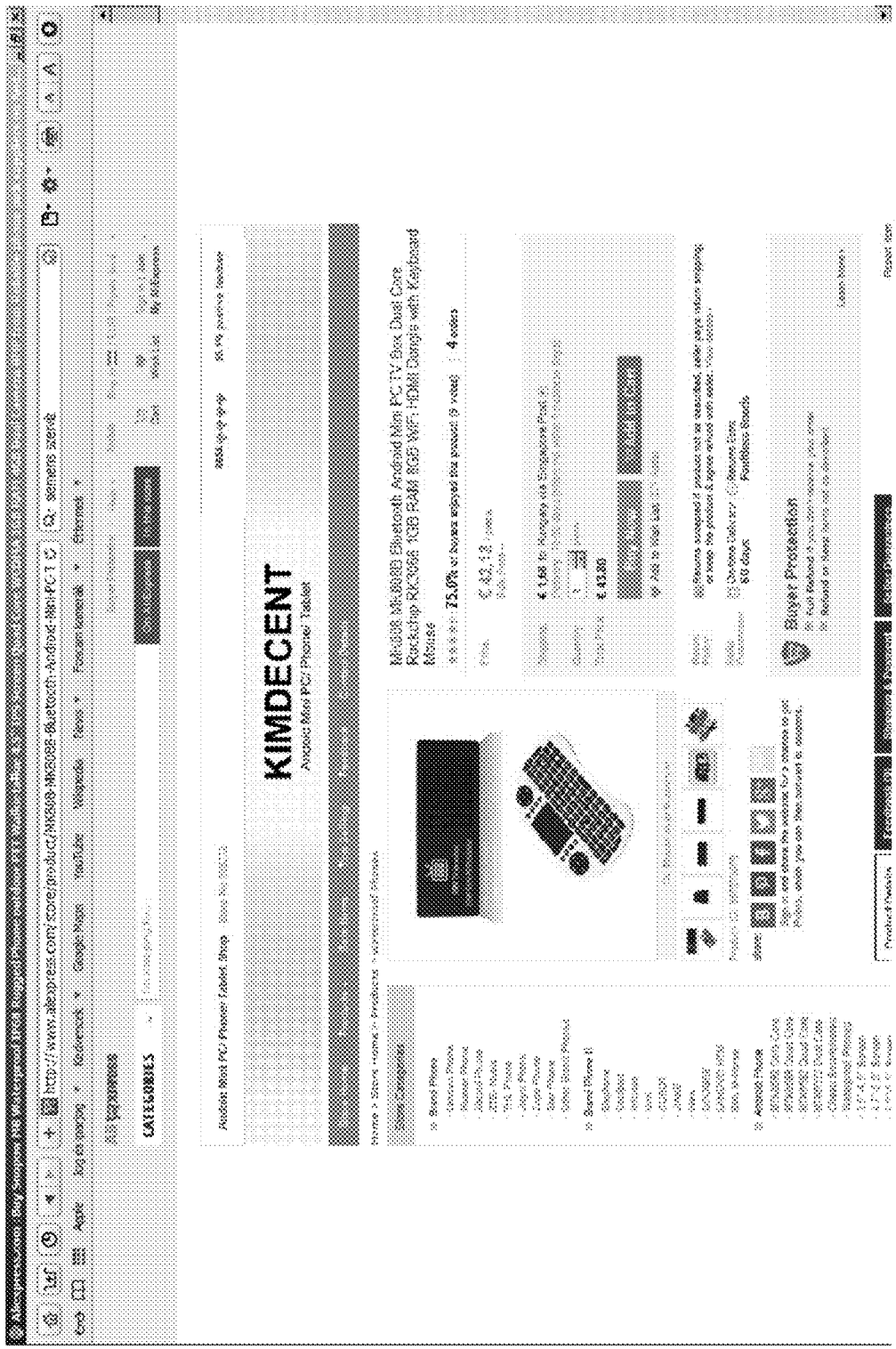
FIG. 3 is the screenshot of a website offering an exemplary hardware tool suitable for the implementation of the proposed method.
Figure 4:
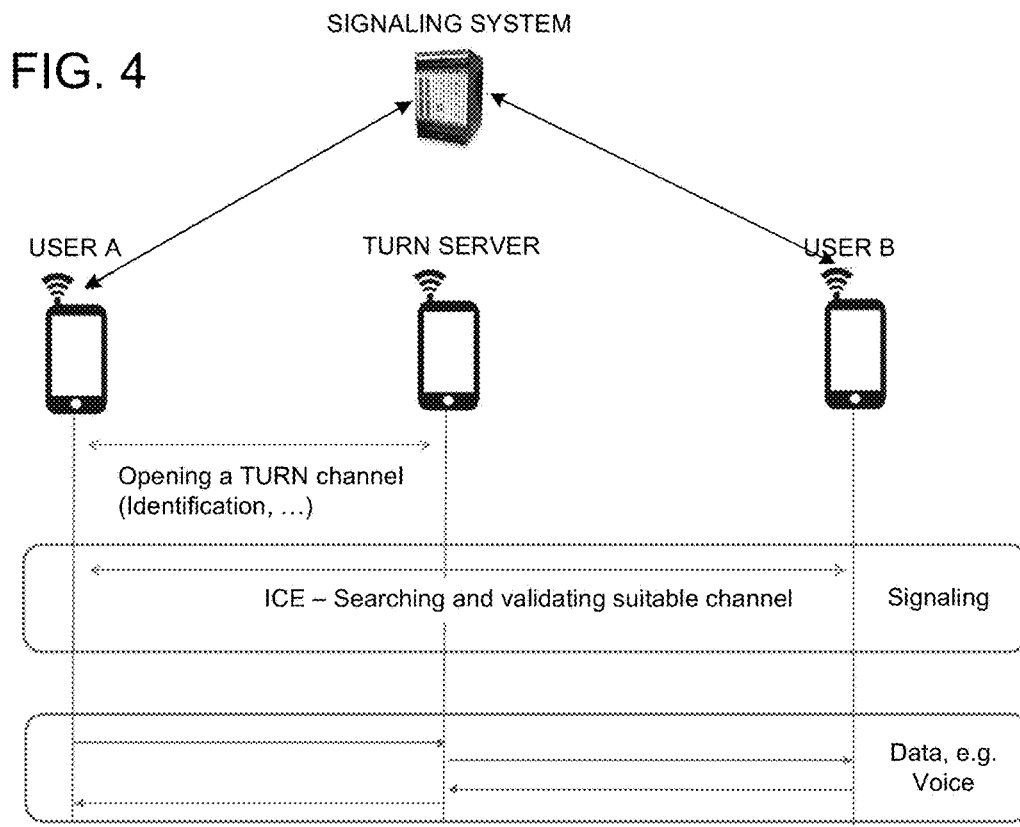
FIG. 4 shows the flowchart of a basic data transmission process.

FIG. 4 shows a flowchart presenting the state-of-art technology. A mobile communication device, e.g. mobile phone, of user A would like to communicate with a mobile communication device, e.g. mobile phone, of user B. One party, user A, can inform the other party, user B, of that through a known signaling channel. This may be a centralised solution of some kind: SIP, XMPP a Mobil ecosystem basis—PUSH, or a shared P2P infrastructure, e.g.: Gnutella. After signaling, both parties use the ICE protocol to examine the possible communication address pairs. If there is no appropriate communication address pair, user A, after having identified itself, may open a channel on the TURN server that can be accessed by user B, and they can communicate directly through that channel. This known solution has the drawback that each and every user is identified one by one on the TURN server with a user name/password pair, and, moreover, each user can only open channels for its own pairs.

One essential feature of the present invention is the consolidation of a communication protocol set that will make the transmission device behind which it is placed suitable for easy and secure sharing with the appropriate IT device of the known structure realising it.

Figure 5:
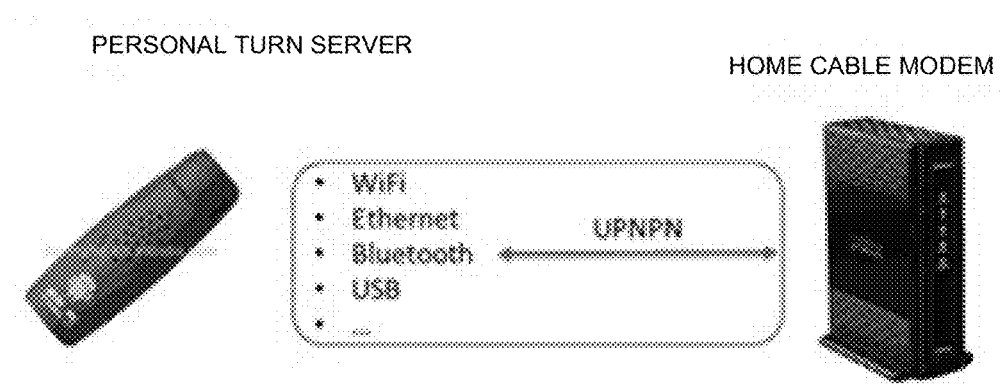
FIG. 5 shows an exemplary home infrastructure that may be regarded as general.

One part of the exemplary home infrastructure shown in FIG. 5 is a hardware tool capable of IP-based communication on WiFi/Ethernet/USB/Bluetooth interfaces, capable of running a TURN server, and of implementing identification based on a proximity protocol (Bluetooth/NFC). This tool is preferably a mini PC of the size of a USB dongle that can be inserted into any device with a USB port. Network access can typically be realised through the WiFi interface of this tool, but its USB and Ethernet, if any, ports can also be used. If necessary, this tool can instruct the local server terminal with the help of the UPNP protocol to make the appropriate NAT connections. That is, this tool is the TURN server that can be installed at the home of any user, for that matter. Where a local NAT exists, the tool can instruct it with the help of UPNP, so it is possible to guarantee Internet connection with an appropriate degree of freedom.

Figure 6:
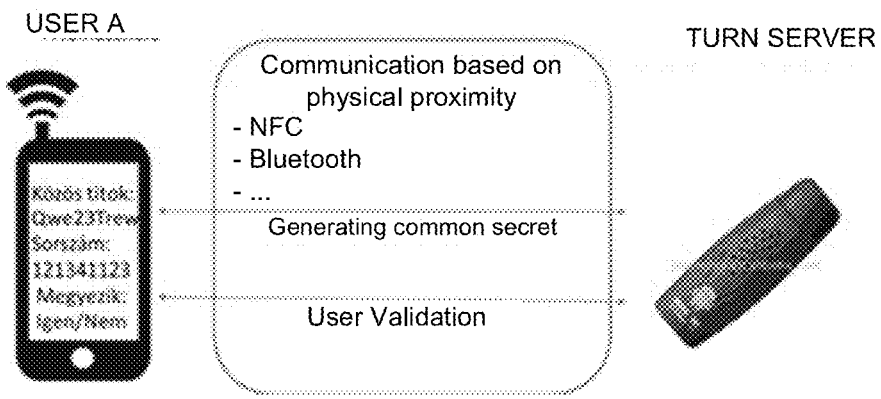
FIG. 6 shows schematically the creation of common secrets between the user and a personal TURN server.

FIG. 6 outlines a possible process of the creation of a common secret between the user and the personal TURN server assigned to it.

Figure 7:
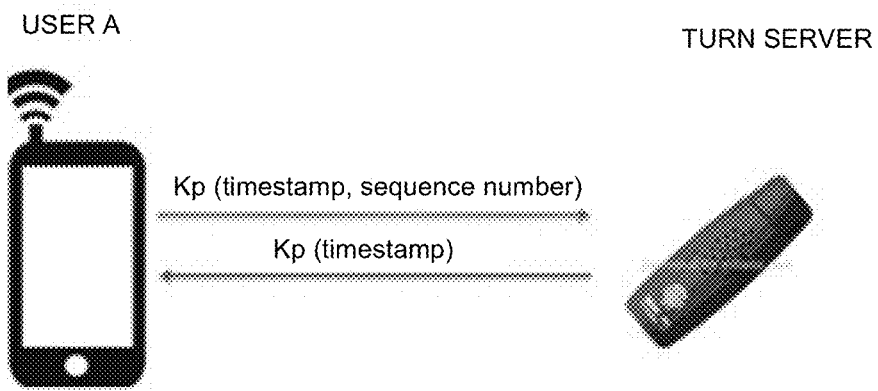
FIG. 7 shows mutual identification of the user and the server over the IP protocol.

The role of the TURN server is to create free Internet connections for the users. This, however, makes it necessary to identify the users and to manage authorisations. The adequate degree of security can only be ensured in the method according to the present invention by including physical proximity as a necessary condition. Thus, as can be seen in FIG. 5, the user can only be granted access to the server when he is physically close to it. This can be ensured by NFC and Bluetooth as the mandatory communication channel. Thus the user goes near (<5 m) the device, and the transmission management software running on his phone and the server with e.g. the NFC protocol can mutually identify each other. This is realised by sending the RIFD addresses on the device or a simple printed serial number over the phone. In addition to this information, the phone also transmits the password defined by the user or generated by the application. The user can then identify himself with this password to the server, wherever he might be, and the server can also identify itself to the user. Identification can take place in the classical way, over the IP protocol, e.g. by returning the Kp (time stamp, sequence number) information (where Kp is the symmetric key generated from the password of the end user, while the Kp( ) is the symmetric encryption function) and by returning the Kp (time stamp)). The foregoing can be traced in FIG. 7.

The application being run on the user's telephone sends the time stamp and the sequence number of the device encrypted by the aid of a symmetric key generated from an extract of the password. The tool then decrypts that by the aid of the key produced also by it, and returns the time stamp only, in encrypted form. Since only the two of them knew the common secret, they have managed to identify each other this way. This communication session is realised over the IP protocol. The program running on the phone can find the own transmitter e.g. with the help of a dynamic DNS or the already existing P2P infrastructure. In one embodiment of the method according to the invention, in order to use the user's password less frequently, it is replaced by a complex password generated by the server with the help of the ticket-requesting solution known in the Kerberos protocol. (TGT—ticket granting ticket).

Figure 8:
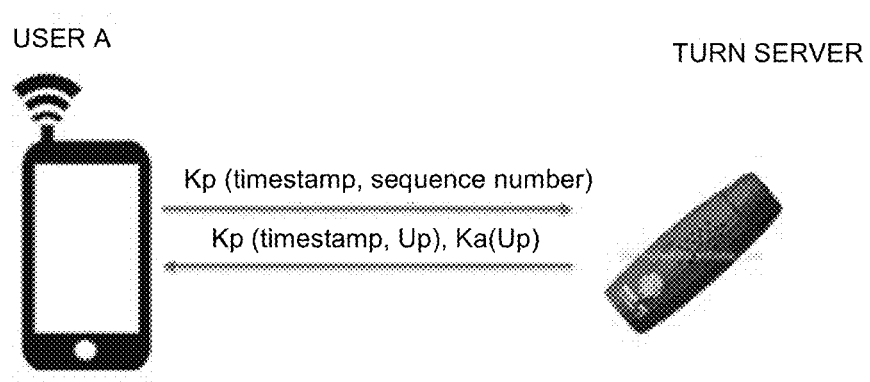
FIG. 8 shows the process of the temporary replacement of the user's password.
Figure 9:
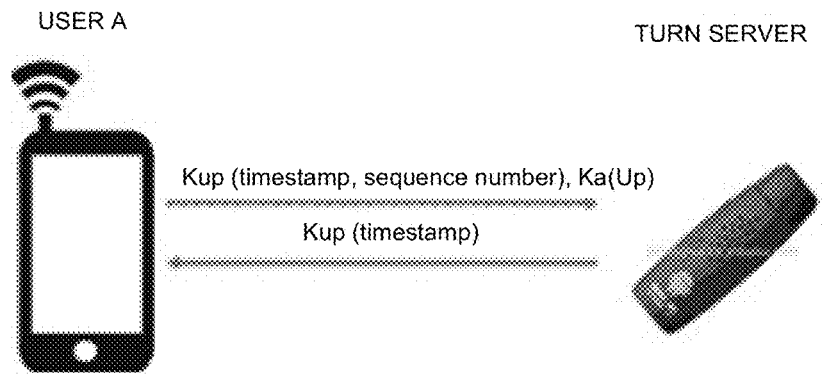
FIG. 9 shows identification realised with the help of TGT.

FIG. 8 outlines the process of the temporary replacement of the user's password. The user is sent the new password (Up) by the server and it is sent also encrypted with its own secret password Ka(Up); this is the ticket-securing feature. User identification then takes place according to the sketch in FIG. 9. When the user wants to turn to the transmitter, he sends the usual pieces of information encrypted by the symmetric key generated from an extract of the received password and also the TGT-(Ka(Up)) datum. The server can read the password from the Ka(Up), and with the help of the shared key generated with the help of the extract generated from it, it can decode the message.

This, however, is not the essential point of the present invention. Here first the users must mutually identify each other. They can do that with their common secret. Another advantageous option to enhance security is physical proximity as a requirement for making user partner contacts. Of course, the method can be implemented also without that, but it can be offered to the users as a secure version.

Figure 10:
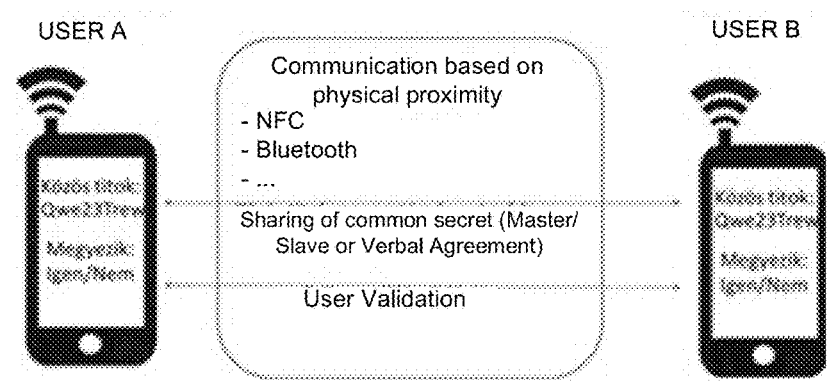
FIG. 10 shows the generation of common secrets between users.

FIG. 10 shows a possible embodiment of generation of common secrets between users; the entered or generated password shown in the display must be identical on the two sides, with the communication channel being based on physical proximity. If the matching is effective, the two user applications can then identify each other from that time on.

Figure 11:
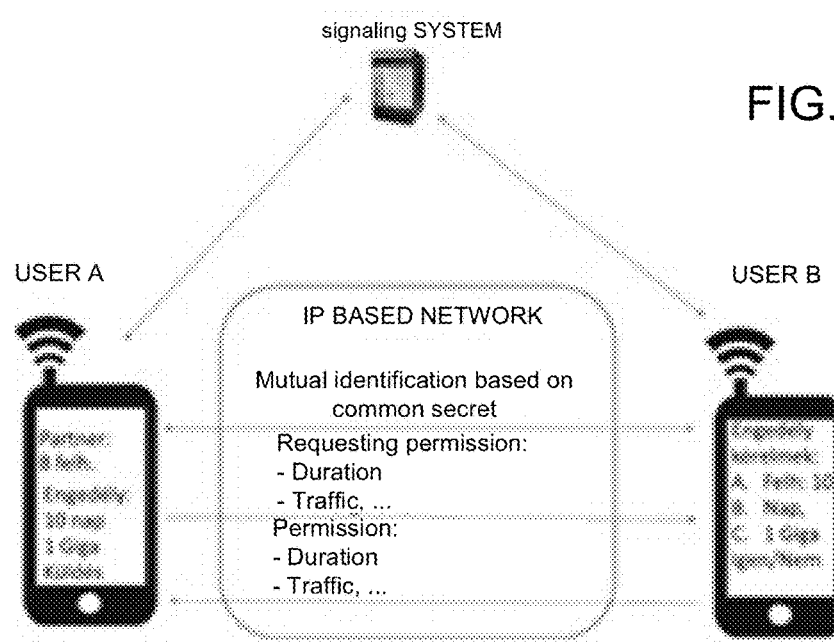
FIG. 11 shows the request for permission from user B to user A.
Figure 12:
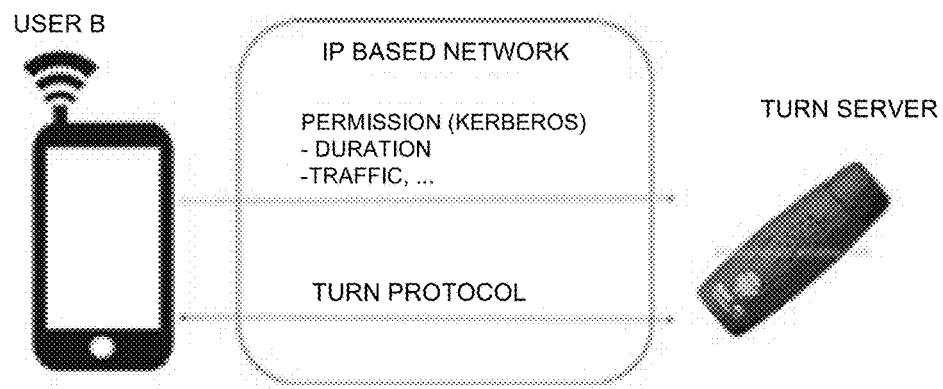
FIGS. 12, 13 show how user B uses the TURN server of user A.
Figure 13:
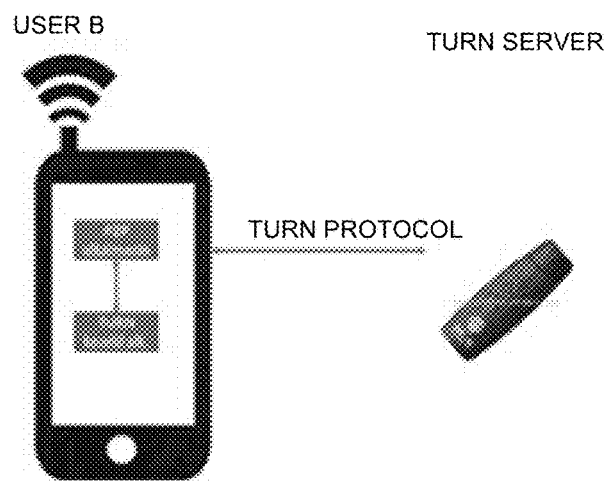

FIG. 11 shows how user B requests permission from user A to use the TURN server. User A will find user B with the help of the usual signaling system and, if necessary, they can also communicate with each other through it (SIP, XMPP, PUSH, P2P overlay, . . . ). Mutual identification takes place as described above. User B provides the requested service parameters (of course, this can also take place automatically). User A, if he grants the permission, creates a Kerberos ticket comprising the appropriate data. The ticket is no other but the permission parameters encrypted with the temporary password of user A (Ktb(timestamp, duration, traffic, . . . )), and the TGT of user A (from which the server can read the password). User B can then address the server of user A with this ticket that can be found and used with the dynamic DNS or signaling system or the P2P solution, as shown in FIG. 12. This may take place any time within the specified period, even if the user is inaccessible.

Thus the invention described above makes it possible to request to use a TURN server operated by a third party and then to use it. To make it possible for the specific P2P applications to actually use the TURN servers, applications running on a mobile device, e.g. a phone, have to request an appropriate TURN server by communicating with the local application. Here different metrics such as bandwidth, reliability, data traffic turnover etc. may be taken into account in selecting the TURN server.

The system taking advantage of the method is composed of the TURN (P2P service) servers at the end-users and, moreover, a management application on a mobile communication device, e.g. a mobile phone, and a signaling channel infrastructure (e.g.: SIP, XMPP, P2P, . . . ).

Figure 14:
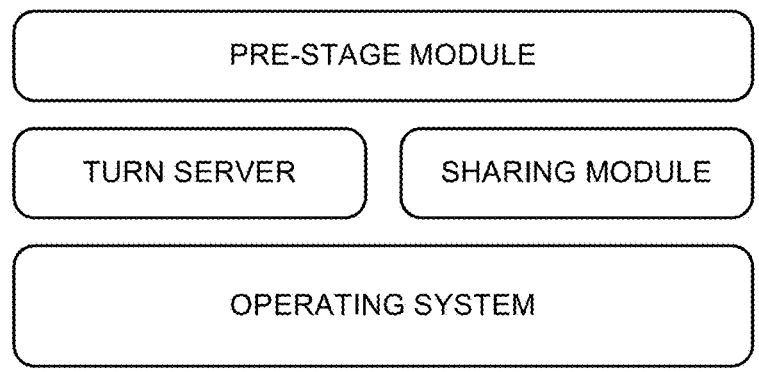
FIG. 14 presents the specific sub-processes of the method implemented by the server.

FIG. 14 outlines the specific sub-processes of the method realised by the server, in a modular way.

Figure 15:
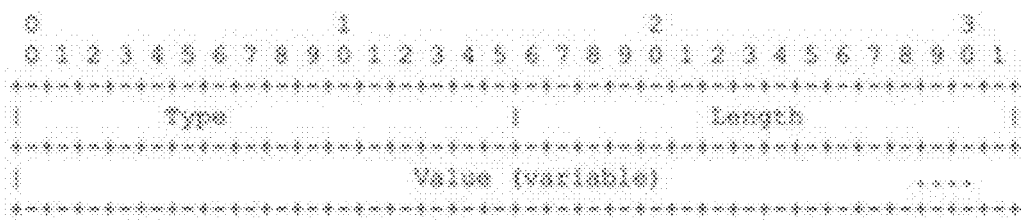
FIG. 15 presents the structure of an own STUN field.

In order to make it possible to make the Kerberos ticket associated with the identification and authorisations pass an existing TURN protocol, a pre-processing module is to be created that will extract this extra piece of information relative to the standard TURN protocol—based on the extension method defined in Chapter 15 of Standard RFC5389, it is transmitted with the help of an own STUN field, the structure of which is outlined in FIG. 15.

This module will then be extracted from the message with the pre-processing module and transfer it to the sharing module, by which the password extract will be produced by decrypting the field, then it will be transferred to the TURN server. The TURN server may then operate in the standard way. With the help of the sharing module, on the basis of the sharing data (duration/traffic) read from the message, we can instruct the pre-processing module that measures these characteristics, and if a given threshold value is reached, it interrupts the communication connection.

The TURN client program being run on a mobile device is to be supplemented in order to insert the special field specified above. Its content is provided by a module managing the sharing, in function of the specific mobile platform concerned.

The invention claimed is:

1. A communication method in a communication network from a first user device to a target partner device, said method comprising the steps of
performing authorization management with respect to the user devices taking part in a communication session for establishing a communication connection,
performing mutual registration and validation between the first user device initiating the communication session and the target partner device, establishing a communication route to the target partner device not reachable by direct addressing by by-passing a node blocking a direct connection, setting up a TURN server at one or more user devices of the communication network in response to a definite and pre-granted request or in advance, implementing the communication route to be established via at least one mentioned personal TURN server, creating a common secret between the first user device and the personal TURN server assigned to it, mutually identifying the first user device and the personal TURN server, temporarily replacing a password of the first user device for the personal TURN server by a complex password generated by the server with the help of a ticket-requesting solution TGT, identifying the first user device with the help of TGT, creating common secrets between the first user device and the target partner device, checking that the entered common secret passwords defined or generated by the first user are identical at the first user device and the target partner device, requesting a permission for using the personal TURN server from the target partner device, in case of granting the permission, creating a Kerberos ticket comprising the permission parameters encrypted with the temporary password and the TGT of the first device, after granting the permission, addressing the personal TURN server of the target partner device with said ticket for performing the communication, and implementing the steps listed above for the personal TURN server in a personal computer, PC, of the size of a USB dongle attachable to any device with a USB port.

2. The method according to claim 1 comprising the step of performing the mutual registration and validation in the physical proximity of the first user device and the target partner device taking part in the communication.

3. The method according to claim 2 wherein the step of mutual registration and validation comprises using a short-range wireless communication protocol.

4. The method according to claim 3 further comprising the step of using NFC or Bluetooth protocol as a short-range wireless communication protocol.

5. The method according to claim 1 further comprising the step of enabling communication between two users via the personal TURN server established previously at a third user device and following successful authorization management of the authorizations of the user devices intending to perform a communication session by the third user device.

* * * * *